United States Patent Office 3,436,372
Patented Apr. 1, 1969

3,436,372
POLYAMIDE-ACID AND POLYIMIDE POLYMERS CROSSLINKED WITH SELECTED HYDRAZINES AND HYDRAZIDES
Erhard F. Hoegger, Ardentown, Wilmington, Del., assignor to E. I. du Pont de Nemours and Company, Wilmington, Del., a corporation of Delaware
No Drawing. Filed May 2, 1966, Ser. No. 546,561
Int. Cl. C08g 20/32; C09j 3/16
U.S. Cl. 260—65                         3 Claims

ABSTRACT OF THE DISCLOSURE

Crosslinked aromatic polyamide-acid and polyimide polymers crosslinked with hydrazines and hydrazides, which are effective adhesives for other polyimides and polyamides.

This invention relates to polyamide-acid and polyimide polymers.

According to the present invention, there is provided novel crosslinked polymer products formed by reaction of a class of aromatic polyamide-acids and polyimides with a class of selected hydrazines and hydrazides.

The properties of the final crosslinked polymer renders it particularly suitable to meet specific end uses without substantial loss of the desirable mechanical, electrical, thermal and other qualities of the polyamide-acids and polyimides. For example, the crosslinked product adds desired rigidity to finished products in such applications as adhesives, coatings, etc.

The polyamide-acids and polyimides which according to this invention can be advantageously crosslinked as described below are basically of two groups:

Polyamide-acids and polyimides consisting essentially of at least one of the following recurring structural units:

(1)
$$\left[\begin{array}{c}\text{HOOC}\quad\text{COOH}\\\diagdown\;\text{R}\;\diagup\\\text{—NH—C}\quad\text{C—NH—R}^1\text{—}\\\parallel\quad\quad\parallel\\\text{O}\quad\quad\text{O}\end{array}\right]_n$$

and (2)
$$\left[\begin{array}{c}\text{O}\quad\quad\text{O}\\\parallel\quad\quad\parallel\\\text{C}\quad\quad\text{C}\\\diagup\;\diagdown\;\text{R}\;\diagup\;\diagdown\\\text{—N}\quad\quad\quad\quad\text{N—R}^1\text{—}\\\diagdown\;\diagup\quad\quad\diagdown\;\diagup\\\text{C}\quad\quad\text{C}\\\parallel\quad\quad\parallel\\\text{O}\quad\quad\text{O}\end{array}\right]_n$$

where the arrows denote isomerism.
R is a radical selected from the group consisting of:

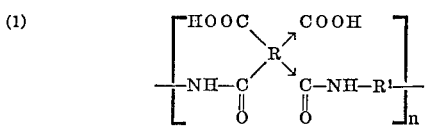

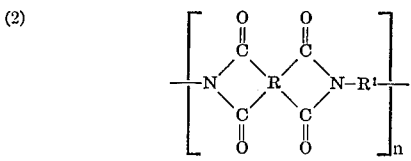

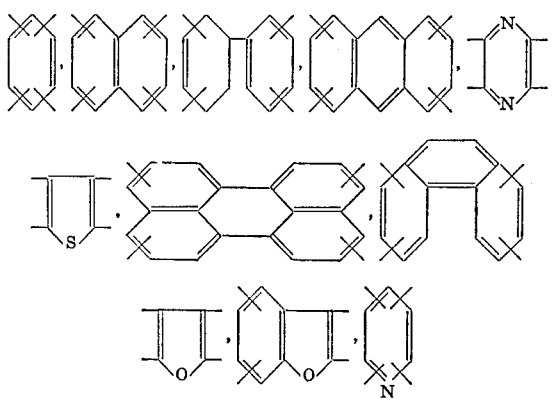

and

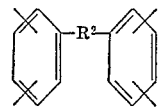

where $R^2$ is selected from the group consisting of an alkylene chain having 1–3 carbon atoms, $$-O-,\ -S-,\ -SO_2-$$

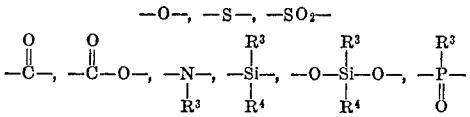

and

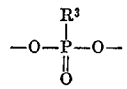

where $R^3$ and $R^4$ are selected from the group consisting of alkyl and aryl and substituted groups thereof.
$R^1$ is a radical selected from the group consisting of:

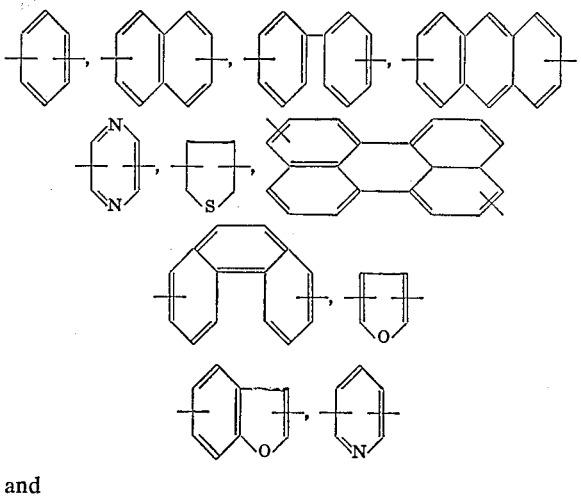

and where $R^2$ has the same meaning as above; $n$ is a number sufficient that said polymer has an inherent viscosity of at least 0.1 as measured at 30° C. on an 0.5% by weight solution in concentrated sulfuric acid; and wherein at least one of said R and $R^1$ radicals per each thirty of said recurring structural units contains at least one ketonic carbonyl group with each of said R and $R^1$ radical having a maximum of about 24 carbon atoms.

It will be understood that the polymers defined above can be from 0 to 100% polyamide-acid units of Formula 1 above and from 100% to 0 polyimide units of Formula 2 above, such polymers containing at least one of the above-described essential groups. The above polymers can be prepared by condensation.

The above polymers can be prepared by condensation polymerization procedures known in the art and described for example in Edwards U.S. Patent No. 3,179,614; Endrey U.S. Patent No. 3,179,630; Endrey U.S. Patent No. 3,179,633; and Edwards U.S. Patent No. 3,179,634; all issued Apr. 20, 1965. Using the techniques described in the patents just mentioned, one or more aromatic tetracarboxylic acid dianhydrides is reacted with one or more aromatic diamines of structures such as to obtain the above defined polyamide-acid which is then converted to polyimide by thermal or chemical means or both, as described in those patents.

To provide the essential functional group necessary to accomplish the subsequent crosslinking according to this invention, either the starting aromatic tetracarboxylic acid dianhydride or the starting aromatic diamine or both can contain the essential functional group, and enough will of course be used to provide the required amount, i.e. at least one such essential functional group per 30 polymer units.

Representative diamines and tetracarboxylic acids, which can provide the desired crosslinkable sites in polyimides based upon them, include:

2,2'-diaminobenzophenone
3,3'-diaminobenzophenone
4,4'-diaminobenzophenone
benzophenone-2,3,2',3'-tetracarboxylic acid
benzophenone-2,3,3',4'-tetracarboxylic acid
benzophenone-3,4,3',4'-tetracarboxylic acid
3-benzoyl pyromellitic acid.

Representtaive dihydrazines and dihydrazides include:

ethylene-1,2-dihydrazine
p-phenylenedihydrazine
alpha,alpha'-dimethyl-p-phenylenedihydrazine
alpha,alpha'-diethyl-m-phenylenedihydrazine
1,4-dihydrazinophthalazine
succinoyl dihydrazide
isophthaloyl dihydrazide
terephthaloyl dihydrazide
pyridine-2,4-dicarbonyl dihydrazide.

Position isomers of any of the above-listed dianhydrides an diamines can also be used.

Besides the polyamide-acid route described above, the above-described polyimides suitable for crosslinking can also be prepared by the use of appropriately selected polyimide precursors other than polyamide-acids, such as polyisoimides according to procedures described in Angelo U.S. patent application Ser. No. 325,479 filed Nov. 21, 1963, now U.S. Patent 3,282,898; polyamide-esters according to precedures described in Angelo U.S. patent application Ser. No. 311,307 filed Sept. 25, 1963, now U.S. Patent 3,316,211, Angelo U.S. patent application Ser. No. 311,326 filed Sept. 25, 1963, now U.S. Patent 3,282,897, Sorenson U.S. patent application Ser. No. 288,535 filed June 17, 1963, now U.S. Patent 3,312,663, Tatum U.S. patent application Ser. No. 325,497 filed Nov. 21, 1963, now U.S. Patent 3,261,811, and Tocker U.S. patent application Ser. No. 332,889 filed Dec. 23, 1963, now U.S. Patent 3,326,851; and polyamide-amides according to procedures described in Angelo and Tatum U.S. patent application Ser. No. 325,442 filed Nov. 21, 1963, now U.S. Patent 3,316,212; all assigned to the same assignee as that of the present application.

As mentioned above, the novel crosslinked polymer products of this invention are prepared by reaction of the appropriate polyamide-acids and/or polyimides with at least one of a class of hydrazines and hydrazides of the formula (3)  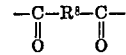

to provide a crosslinking bridge of the structure (4)  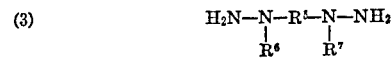

wherein $R^5$ has from 2 through 10 carbon atoms and is selected from the group consisting of alkylene, arylene, heterocyclic and

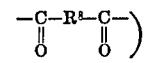

where $R^8$ is selected from the group consisting of alkylene of at least 2 carbon atoms, arylene and heterocyclic; and $R^6$ and $R^7$ are each selected from the group consisting of hydrogen, methyl and ethyl. $R^5$ is preferably aromatic and more preferably monocyclic and bicyclic benzenoid, and nitrogen-heterocyclic, and the corresponding diacyl radical (i.e. when $R^5$ is

The reaction which effects the desired crosslinking can be carried out using conventional techniques, illustrated below. The crosslinking agent can be incorporated in the polymer before or after the polymer is shaped, and before or after the polyamide-acid is converted partly or all to polyimide. Preferably, prior to conversion of the polyamide-acids of this invention into the polyimides, the solvent-soluble polyamide-acid will be coated onto any of various substrates, or formed into the desired shape such as a film, fiber, tube, etc. The substrates can be metals, inorganic materials such as glass, mica and asbestos, or organic polymers. Representative metals are copper, aluminum and steel. Glass and the organic polymers can be in the form of sheets, films, woven or non-woven fabrics, etc.

The amount of crosslinking will depend on such factors as the incidence of available sites and the amount of crosslinking agent or agents used, both factors being determined by the nature of the effect desired, as will readily be understood by persons skilled in this art.

The resulting crosslinked polymers are useful as films, coatings, fibers, papers, wire enamels, impregnants and adhesives. They have excellent properties over a broad use-temperature range and provide an array of materials with a combination of density, and mechanical, electrical and thermal properties suitable for many such uses. The cross-linking of this invention is particularly useful in the adhesives industry, in which polyimides are finding their way, to permit application of high solids solutions of a workable viscosity which will readily wet the surfaces which are to be bonded together. By means of crosslinking, the adhesive becomes insoluble and less fusible at the temperature at which the bond is made. As a result the bond retains good strength but is no longer solvent-sensitive or fusible at functional temperatures.

The crosslinked polymides are effective adhesives for polyimides, polyamides, metals, glass, asbestos, mica and the like, in any of their physical forms. Bonding is accomplished by coating or impregnating with a solution of the appropriate polyamide-acid, containing a dialdehyde or diketone. The heat required for thermal conversion of the polyamide-acid usually is sufficient to effect crosslinking. If not, additional heating can be used.

The invention will be further understood by reference to the following illustrative examples in which parts and percentages are by weight unless otherwise indicated.

EXAMPLE 1

A 10% polyamide-acid solution was made as follows: 30.4 grams sublimed and dried (vacuum overnight) of 4,4'-diaminodiphenylmethane was dissolved in 764 milliliters of N,N-dimethylacetamide (DMAC). To this solution was slowly added under nitrogen with stirring 50.0 grams of benzophenone-3,3',4,4'-tetracarboxylic acid dianhydride which was previously sublimed, washed and dried at 160° in vacuo. After four hours reaction time the solution viscosity was constant and the polymer had an inherent viscosity in DMAC (0.5%; at 23° C.) of 0.94.

To 50 grams of the 10% polyamide-acid solution in DMAC prepared above was added a solution of 0.2 gram of 1,4-dihydrazinophthalazine in 5 grams of DMAC and the mixture was mixed well. After about one hour's standing at room temperature, the mixture gelled to a solid. The control, to which DMAC was added without the dihydrazino compound, stayed liquid for several weeks at room temperature.

Heat sealable films were prepared by coating (before gelation) the crosslinkable composition onto one side of a 3-mil film of the polypyromellitimide of bis(4-aminophenyl) ether, and heating the coated film 30 minutes/100° C., 60 minutes/160° C. and 10 minutes at 300° C. The heat seals prepared from these films by pressing for 30 seconds at 400° C. (about 300 pounds per square inch) gave average strengths of 1160 grams per inch, while non-crosslinked controls gave seal strengths of 840 grams per inch.

EXAMPLE 2

In a procedure similar to Example 1, 50 grams of the same polyamide-acid solution was mixed with 0.2 gram of 1,4-dihydrazinophthalazine and 0.2 gram of p-toluenesulfonic acid in 5 grams of DMAC. After letting the solution sit for only 30 minutes at room temperature, it solidified to a gel. Heat sealable coatings prepared immediately after mixing by a similar procedure to that of Example 1 gave heat seals averaging a strength of 1850 grams per inch as compared with 840 grams per inch for the control without the dihydrazine.

EXAMPLE 3

Polyimide films were made from a 10% solution of the same polyamide-acid as described in Example 1, by evenly spreading the solution on a glass plate, evaporating the solvent by heating at 100°, then at 160° for 1 hour. and accomplishing cyclization to the imide by heating 30 minutes at 300°.

Another batch of films were made from the same 10% solution, except that 2% by polymer-weight (0.2% by solution-weight) of 1,4-dihydrazinophthalazine was first added. Coating and preparation of the films occurred as with the controls without crosslinking agent, as described above. The crosslinked films showed on the average a modulus of 410,000 pounds per square inch, an elongation of 7.2% and a tensile strength of 15,600 pounds per square inch, whereas the uncrosslinked ones showed on the average a modulus of 390,000 pounds per square inch, an elongation of 5.4% and a tensile strength of 14,200 pounds per square inch.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

The invention claimed is:

1. A crosslinked polymer which is the reaction product of at least one crosslinking agent selected from the group consisting of ethylene-1,2-dihydrazine, p-phenylenedihydrazine, alpha,alpha'-dimethyl-p-phenylenedihydrazine, 1,4 - dihydrazinophthalazine, alpha - alpha'-diethyl - m-phenylene-dihydrazine, succinoyl dihyrazide, isophthaloyl dihydrazide, terephthaloyl dihydrazide and pyridine-2,4-dicarbonyl dihydrazide, and a ketonic carbonyl-containing member selected from the group consisting of an aromatic polyamide-acid polymer and an aromatic polyimide polymer, said member containing at least one ketonic carbonyl per thirty recurring units in said polymer.

2. A crosslinked polymer according to claim 1 in which said crosslinking agent is 1,4-dihydrazinophthalazine.

3. A crosslinked polymer according to claim 1 in which said polymer, which is reacted with said crosslinking agent, is a reaction product of 4,4'-diaminodiphenylmethane and benzophenone-3,3',4,4'-tetracarboxylic acid dianhydride.

References Cited

UNITED STATES PATENTS 3,360,502  12/1967  Loncrini _____ 260—78

WILLIAM H. SHORT, *Primary Examiner.*

L. L. LEE, *Assistant Examiner.*

U.S. Cl. X.R.

260—47, 78